July 7, 1959     W. M. SCHULZE     2,893,242
PIVOT POINT PROBE
Filed Nov. 17, 1955
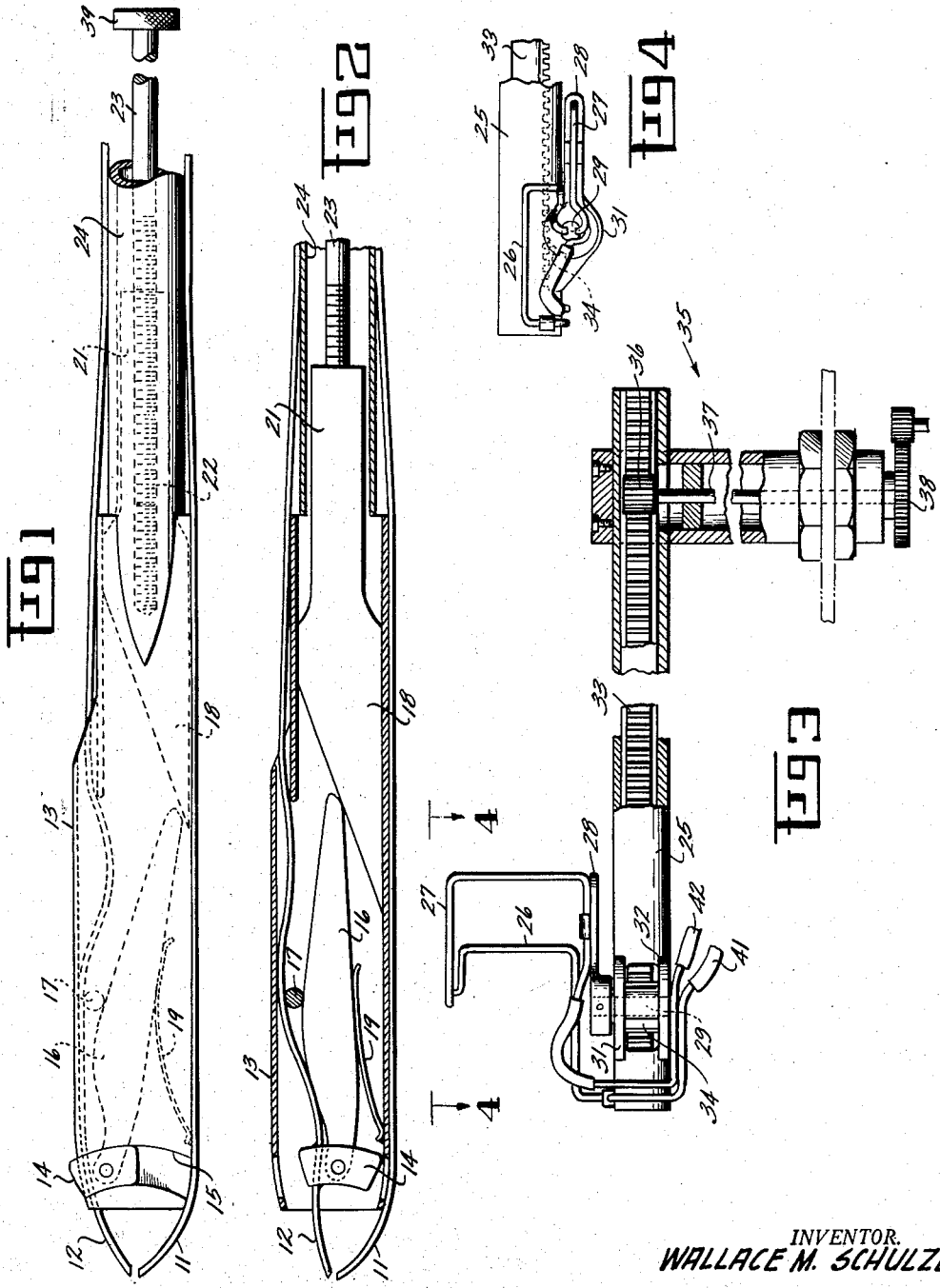
INVENTOR.
WALLACE M. SCHULZE
BY
Edward M. Tittle
HIS ATTORNEY

United States Patent Office 2,893,242
Patented July 7, 1959

2,893,242

PIVOT POINT PROBE

Wallace Milton Schulze, Mason, Ohio, assignor to General Electric Company, a New York corporation Application November 17, 1955, Serial No. 547,367

8 Claims. (Cl. 73—188)

The present invention relates to a fluid-flow measuring instrument and more particularly to a pivot point probe for measuring the angle of flow of a stream of fluid.

Measurement of the direction or angle of flow of a moving stream within a confined space in a field with varying total pressure gradient has heretofore been a tedious and time consuming process since the instruments available have required multiple passes, tedious data comparisons, precise alignments or complicated auxiliary equipment and delicate parts. In addition, in instruments using the null method wherein an instrument having two pressure pickups is adjusted so that equal pressure is sensed in both pickups, the flow is sometimes split ahead of the pickups so that each pickup is separately and unequally influenced by the adjoining flow field; or the point at which the angle measurement is taken moves as the instrument is adjusted to the null orientation; or the two pressure samples are not obtained close enough together in the uneven flow field so that they can be compared by the null method without introducing appreciable error.

The present invention overcomes the disadvantages of prior known instruments by provision of an instrument for measurement of the flow angle in a field with varying total pressure gradient and one which will not stray from the point at which the measurement is desired even though supported from far downstream. This is accomplished by providing a pair of opposed pressure pickup tubes in close proximity, and means for varying the included angle between the pickup tubes to provide an orientation which results in identical pressures in both of said tubes. This is accomplished by pivoting one or both of the pick-ups about the point at which the measurement is desired.

An object of the present invention is the provision of a fluid-flow angle measuring instrument which gives accurate readings under the adverse conditions of total pressure gradient, flow angle gradient and downstream instrument support.

Another object is the provision of a fluid-flow angle measuring instrument which is operable according to the null method and in which the angle between the pressure pickups is varied to sense identical pressure in both pickups.

Other objects and many of the attendant advantages of this invention will be readily appreciated as the same becomes better understood by reference to the following detailed description when considered in connection with the accompanying drawings wherein:

Fig. 1 is an elevation view of a pivot point probe according to the present invention;

Fig. 2 is an elevation view in section of the probe of Fig. 1 wherein the angle between the pressure pickups has been increased;

Fig. 3 is an elevation view partly in section of another embodiment of the present invention; and Fig. 4 is a plan view taken along lines 4—4 of Fig. 3.

Referring more particularly to the drawings, the embodiment of the invention illustrated in Figs. 1 and 2 includes a pair of pressure pickup tubes 11 and 12 mounted in a main shell or carrier 13. The tube 11 is affixed to the shell 13 and at its free end extends beyond the end of the shell and is bent towards the longitudinal center line thereof. The free end of tube 12 likewise projects beyond the shell and is displaced towards the longitudinal center line of the shell in the same plane as tube 11 but the tube 12 itself is movably mounted within the shell. A slide 14 surrounds and is secured to the tube 12 and is received in an arcuate groove 15 in the shell. An elongated link 16 is pivotally connected at one end to the slide 14. The upper surface of the link 16 bears against a pin 17 which is secured to the shell 13, while the end of the link removed from the slide bears against the inclined surface of cam 18 and acts as a cam follower. A restoring spring 19 is attached to the bottom surface of the link and bears against the inner surface of the shell. An elongated tang 21 is formed integral with the cam 18 and is internally threaded as at 22 to receive the externally threaded end of a control rod 23. A tube or conduit 24 surrounds the control rod 23 and the tang 21 and is connected to the main shell 13.

The embodiment of the invention illustrated in Figs. 3 and 4 includes a tubular shell or carrier 25 and a pair of pressure pickups 26 and 27 which project from one side of the shell. The tube 26 is affixed to the shell and is provided with a reverse curve near its free end and the free end itself is offset. The tube 27 is pivotally mounted on the shell 25 and is likewise provided with a reverse curve near its extremity such that the open end thereof lies in the same plane as the open end of the tube 26. The extremities of both tubes are displaced towards each other, as shown in Fig. 4, so that the open ends are opposed and in close proximity. Tube 27 is mounted on an arm 28 which is secured at one end to a pin 29. The pin 29 is inserted in aligned openings in the brackets 31 and 32 affixed to the shell, such that the central axis of the pin lies on a line which passes between the open ends of the tubes 26 and 27. An elongated rack 33 is positioned in the interior of the shell and meshes with a spur gear 34 mounted on the pin 29. The shell 25 is connected to a suitable supporting member 35 at a point removed from the pressure pickups. The supporting member 35 includes means for positioning the pressure pickups such as, the spur gear 36, the shaft 37 and the crank 38.

In the operation of the device of Figs. 1 and 2, the probe is positioned so that the point at which the measurement is desired to be taken lies between the opposed ends of the tubes 11 and 12. The probe is then supported in the desired position by a suitable supporting means (not shown) located downstream from the point at which the measurement is taken. The control rod 23 is then rotated by an adjusting means shown diagrammatically as a thumb screw 39. Rotation of the control rod in the proper direction advances the cam 18 to the position shown in Fig. 2, thus forcing the cam-follower end of the link 16 to rise up the inclined surface of the cam causing the link to pivot about the pin 17. As the cam-follower end of the link rides up the inclined surface of the cam the slide 14 is forced downwardly in the groove 15. Movement of the slide in the groove causes the tube 12 (or a flexible segment inserted therein) to flex between the slide and the pin 17, and varies the included angle between the opposed ends of the tubes 11 and 12. The center of curvature of the arcuate groove 15 lies between the opposed ends of the tubes 11 and 12 at the point at which the measurements are taken and the tube 12 is affixed to the slide 14.

Therefore it is possible to vary the included angle between the opposed ends of the tubes without movement of either the main axis of the probe or the point at which the measurement is taken. Control rod 23 is rotated to vary the angle between the pressure pickup tubes until the pressures received in tubes 11 and 12 are balanced. The point of balance or equilibrium may be noted by connecting suitable pressure indicating equipment to the downstream ends of the two tubes. The angle between the flow path of the fluid and the longitudinal axis of the probe is a function of the rotational movement of the control shaft, so the adjusting means 39 may be calibrated to give direct readings of this angle.

In the operation of the embodiment of the invention shown in Fig. 3, rotation of the crank 38 is transmitted through shaft 37 to gear 36 where the rotation of the gear advances or retracts the rack 33. Movement of the rack causes gear 34 to rotate which in turn rotates pin 29 and the attached arm 28. Tube 27 carried by arm 28 is thus rotated with relation to tube 26 until the pressures in both tubes are identical. In this embodiment, tube 27 can swing to either side of tube 26, so that the included angle between the ends of the tubes can be increased or decreased from the intermediate position shown in Fig. 4. This permits measurement of flow angles on either side of the longitudinal axis of the shell without movement of the instrument or the point at which the measurements are taken. As in the embodiment of Figs. 1 and 2, the point of pressure balance or equilibrium can be observed by suitable pressure indicators connected to leads 41 and 42, and crank 38 can be calibrated to give direct readings of the angle between the longitudinal axis of the shell and the fluid flow path.

In each of the illustrated embodiments the pressure pickups project from the supporting shell so that the flow of fluid is not split ahead of the point at which the measurements are taken. Also, the open ends of the pickups are opposed and in close proximity so that pressure samples are obtained close enough together for comparison without appreciable error, and the pickups are not susceptible to error from cross flow velocity components at right angles to the plane of fluid flow. In addition, the probe of the present invention has an inherent doubling of measuring accuracy since the nulling action is performed by moving only one pickup, so that the angle of the fluid flow vector sensed moves through only one-half the range of the tube angle change.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed is:

1. In an instrument for measuring the angle of flow of a stream of fluid, a pivot point probe including: a pair of pressure pickup tubes each having an end portion with an opening at the extremity thereof, said end portions extending towards each other with the openings positioned closely adjacent to each other in the same plane; and means operatively connected to at least one of said tubes for varying the angle between the openings.

2. A pivot point probe for detecting the angle of flow of a stream of fluid comprising: a pair of pressure pickup tubes supported adjacent each other, each tube having an end portion with an opening at the extremity thereof, said portions being off-set from the remainder of the tubes and extending towards each other with the openings positioned closely adjacent to each other in the same plane; and means operatively connected to at least one of said tubes for varying the angle between the openings.

3. A pivot point probe for detecting the angle of flow of a stream of fluid within a field with varying total pressure gradient, comprising: an elongated carrier; a pair of open end pressure pickup tubes supported by and projecting from said carrier, the ends of said tubes being displaced towards each other with the openings opposed and in close proximity in the same plane; and means operatively connected to one of said tubes for adjustment thereof to balance the pressures sensed in the opposed openings.

4. A pivot point probe for detecting the angle of flow of a stream of fluid within a field with varying total pressure gradient, comprising: an elongated carrier; a slide mounted in an arcuate groove in said carrier; a pair of open end pressure pickup tubes projecting from said carrier, the ends of said tubes being displaced towards each other with the openings opposed and in close proximity in the same plane, one of said tubes being secured to said slide; and means operatively connected to said slide for positioning it within the groove to vary the angle between said openings and balance the pressures sensed therein.

5. A pivot point probe as defined in claim 4, wherein the center of curvature of the arcuate groove lies between the opposed openings at the point at which the angle measurements are taken.

6. A pivot point probe for detecting the angle of flow of a stream of fluid within a field with varying total pressure gradient, including: a pair of open end pressure pickup tubes, the ends of said tubes being displaced towards each other with the openings opposed and in close proximity in the same plane, said tubes being adapted to be positioned with the openings on either side of the point at which measurements are desired; and means operatively connected to at least one of said tubes for rotating the opening therein about said point as a center of rotation.

7. A pivot point probe for detecting the angle of flow of a stream of fluid within a field with varying total pressure gradient, comprising: an elongated carrier; a pair of open end pressure pickup tubes projecting from the carrier, the ends of said tubes being displaced towards each other with the openings opposed and in close proximity in the same plane; pivot means mounted on said carrier transversely thereof, said pivot means being connected to one of said tubes; and adjusting means operatively connected to the pivot means for rotating the attached tube to vary the included angle between the openings and balance the pressures sensed therein.

8. A pivot point probe, as defined in claim 4, wherein the axis of rotation of the pivot means passes between the opposed ends of the tubes and through the point at which the angle measurements are taken.

References Cited in the file of this patent

UNITED STATES PATENTS

| | | |
|---|---|---|
| 1,752,923 | Mueller | Apr. 1, 1930 |
| 2,377,605 | Binckley | June 5, 1945 |
| 2,650,497 | Renwanz | Sept. 1, 1953 |
| 2,706,409 | Preston | Apr. 19, 1955 |

FOREIGN PATENTS

| | | |
|---|---|---|
| 932,284 | France | Nov. 17, 1947 |